United States Patent [19]

Chung

[11] Patent Number: 5,536,686
[45] Date of Patent: Jul. 16, 1996

[54] PHOSPHATE BINDERS FOR METAL-MATRIX COMPOSITES

[75] Inventor: Deborah D. L. Chung, East Amherst, N.Y.

[73] Assignee: The Research Foundation of State University of New York at Buffalo, Buffalo, N.Y.

[21] Appl. No.: 963,655

[22] Filed: Oct. 20, 1992

[51] Int. Cl.⁶ .................................................. C04B 35/00
[52] U.S. Cl. ........................ 501/111; 501/125; 501/127; 106/690; 428/614
[58] Field of Search ........................... 428/614; 501/111, 501/127, 125; 106/690, 691

[56] References Cited

U.S. PATENT DOCUMENTS

| | | | |
|---|---|---|---|
| 2,883,297 | 4/1959 | Jeitner . | |
| 3,124,419 | 3/1964 | Germain et al. . | |
| 3,427,174 | 2/1969 | Miller | 501/111 |
| 4,269,391 | 5/1981 | Saito et al. | 251/315 |
| 4,334,907 | 6/1982 | Ellis et al. | 423/309 |
| 4,432,799 | 2/1984 | Salazar . | |
| 4,548,253 | 10/1985 | Funatani et al. | 164/97 |
| 4,696,866 | 9/1987 | Tanaka et al. | 428/614 |
| 4,800,175 | 1/1989 | Rapp | 437/160 |
| 4,828,926 | 5/1989 | Lalancette . | |
| 4,833,576 | 5/1989 | Mers et al. | 362/226 |
| 4,854,367 | 8/1989 | Snook | 164/34 |
| 4,871,008 | 10/1989 | Dwivedi et al. | 164/97 |
| 4,872,912 | 10/1989 | Barrall et al. | 501/111 |
| 4,929,493 | 5/1990 | Tünker | 428/207 |
| 5,009,822 | 4/1991 | Sacks et al. | 264/23 |
| 5,032,552 | 7/1991 | Nonami et al. | 501/95 |

FOREIGN PATENT DOCUMENTS 2202054  5/1974  France .

OTHER PUBLICATIONS

"Effect of Chemical Bonding at Low Temperature on the Mechanical Properties of an Unsintered SiC Compact", by Birchall et al., J. Matl. Sci. Lett., vol. 6, No. 12, pp. 1456 et seq. (1987).

"Phosphate Bonded Alumina Castables: Some Properties and Applications", by Gitzen et al., Ceramic Bulletin, vol. 35, No. 6, pp. 217–223 (1956). No month.

"The Chemistry and Binding Properties of Aluminum Phosphates" by Morris, et al., American Ceramic Society Monograph No. 184, (1986).

"Fundamental Study of Phosphate Bonding in Refractories", by Kingery, J. Am. Ceram. Soc., vol. 33, No. 8, pp. 239–250 (1950).

"Casting Particulate and Fibrous Metal–Matrix Composites by Vacuum Infiltration of a Liquid Metal Under an Inert Gas Pressure", by Yang and Chung, J. Matl. Sci. 24, pp. 3605–3612 (1989). No month.

"A Feasibility Study in Monitoring the Setting Process of Aluminum Orthophosphate Bonded Ceramics Using Through Transmission Ultrasound", by Tan et al., Br. Cerm. Trans. J. 88, pp. 138–143 (1989). No month.

"Hot Strength of High–Alumina Refractories", by Palfreyman, Ceramic Bulletin, vol. 49, No. 7, pp. 638–642 (1970). No month.

"An Inhibited Phosphoric Acid for Use in High–Alumina Refractories", by Lyon et al., Ceramic Bulletin, vol. 45, No. 7, pp. 661–665, (1966). No month.

"Phosphate Bonding with Several Calcined Aluminas", by Toy, et al., Ceramics International, vol. 15, pp. 167–171 (1989). No month.

"A Mullite–Corundum Ramming Mass Containing Graphite and Silicon Carbide Additives", by Pirogov et al., Refractories, vol. 28, No. 3–4, pp. 117–123 (1987). No month.

"Cold Setting Properties" and Phosphate Adsorption by Clay and Bond Migration, by W. D. Kingery, J. American Ceramics Society, vol. 33, No. 8, pp. 242–250 (1950). No month.

Primary Examiner—Gary P. Straub
Assistant Examiner—N. M. Nguyen
Attorney, Agent, or Firm—Nixon, Hargrave, Devans & Doyle

[57] ABSTRACT

A binder for binding reinforcement materials is provided in which an aluminum and/or Group IIa-containing compound is combined, in a liquid, with a phosphorus-containing compound wherein said binder has a ratio of phosphorus to aluminum and/or Group IIa ions of 14 to 34, preferably 20 to 30. The binder is useful in binding reinforcement materials, particularly suited for preparing preforms for making metal matrix composite materials.

10 Claims, 1 Drawing Sheet

PHOSPHATE BINDERS FOR METAL-MATRIX COMPOSITES

FIELD OF THE INVENTION

The present invention relates to a binder for use in fabricating metal-matrix composites by liquid metal infiltration.

BACKGROUND OF THE INVENTION

Metal matrix composites ("MMC's) are structurally reinforced materials which normally exhibit superior properties when compared to corresponding unreinforced materials. MMC's are attractive materials for engine components, electronic packaging, and many other structures.

One common method for fabrication MMC's is liquid metal infiltration. Liquid metal infiltration is a process in which liquid metal is permeated into a porous preform of reinforcement material. Upon subsequent solidification of the impregnated preform, the metal becomes the matrix of the resulting composite. Liquid metal infiltration processes include squeeze casting, pressure infiltration, and variations thereof.

The quality of the composites made by liquid metal infiltration is governed not only by the material used for the reinforcement, but also by how these reinforcement materials are binded together as a preform. For example, to obtain near-net-shaped MMC's (i.e., MMC's shaped essentially the same as before metal infiltration), the preform must have sufficient strength to withstand the applied pressure with which liquid metal is forced into the preform interstices. Preform strength is dictated in large degree by the particular binder utilized and the method of preform fabrication. In spite of the importance of binders and preforms in liquid metal infiltration, relatively little research has been conducted on alternative binders for preform processing.

Polymer binders, such as polyvinyl alcohol (PVA), are widely used at room temperature, but cannot withstand temperatures above about 200° C. A variety of binders have been used in ceramic fabrication processes, including oxysulfates, oxychlorides, sodium silicate and hydraulic cements. In contrast to polymer binders, these ceramic binders have high strength at room temperature, but typically result in unsatisfactory low strength when heated to temperatures of 500°–800° C. Consequently, these binders are not suitable for making preforms for many MMC's, because, during metal infiltration, the preform must commonly be heated to temperatures above 200° C. There is thus a need for binders which result in MMC's having superior strength and other properties.

Silica colloid binders are widely used binders for preforms used to fabricate MMC's. However, difficulties are encountered using this binder with some reinforcement materials and metal matrices. For example, carbon and SiC reinforcement materials have a tendency to react with aluminum metal to form aluminum carbide, $Al_4C_3$, and silicon, both of which decrease the performance of the resultant MMC. Thus, the need remains in the art for binders which alleviate the difficulties encountered using SiC and/or carbon fiber reinforcements.

SUMMARY OF THE INVENTION

The present invention relates to a binder prepared by combining, in a liquid, an aluminum-containing compound and/or a Group IIa-containing compound with a phosphorus containing compound. The liquid binder has a ratio of phosphorus to aluminum and/or Group IIa ions of 14 to 34, more preferably 20 to 30. In a preferred embodiment, the aluminum-containing or Group IIa-containing compound is a hydroxide, and the phosphorus-containing compound is phosphoric acid.

The binder of the present invention may be utilized to bind reinforcement materials, and is particularly suited for preparing preforms for making MMC's. The method for binding reinforcement materials includes mixing the binder solution with the reinforcement material, pressing the mixture, and removing moisture from the pressed mixture to form a preform. The preform is then heat treated to above 200° C., preferably at 400° to 900° C., more preferably about 500 C., to bind the reinforcement materials with a type A aluminum or calcium metaphosphate. As a result of heat treating, the ratio of phosphorus to aluminum and/or calcium ions in the preform is reduced to about 3 to 7, more preferably 3 to 5.

A variety of reinforcement materials may be used to form preforms including silicon carbide, silicon, silicon nitride, aluminum nitride, boron carbide, titanium diboride, aluminum oxide, carbon, graphite, silicon oxide, and mixtures thereof. These reinforcement materials may be present, for example, in the form of whiskers, particles, flakes, or fibers.

By heat treating the preform to a temperature of from 400° to 900° C., at least a portion of the phosphorus containing material is converted to type A metaphosphate. This is a preferred phosphate phase for binding preforms. A further result of heat treating is that the ratio of phosphorus to metal ions in the preform is reduced to about 3 to 7, more preferably 3 to 5.

Metal-matrix composite materials may be formed using these heat treated preforms by infiltrating the preform with molten metal, and then allowing the molten metal to cool. Preferred materials for the molten metal include aluminum, magnesium, zinc, tin, lead, copper, silver, indium, and alloys thereof.

After metal infiltration, the MMC may be further heat treated, if desired. For example, for MMC's using carbon reinforcement materials and aluminum matrices, further heat treating at 400°–900° C. helps form aluminum phosphide, AlP, which helps prevent carbon from reacting with the aluminum matrix.

DETAILED DESCRIPTION OF THE DRAWING AND INVENTION

Figure 1:
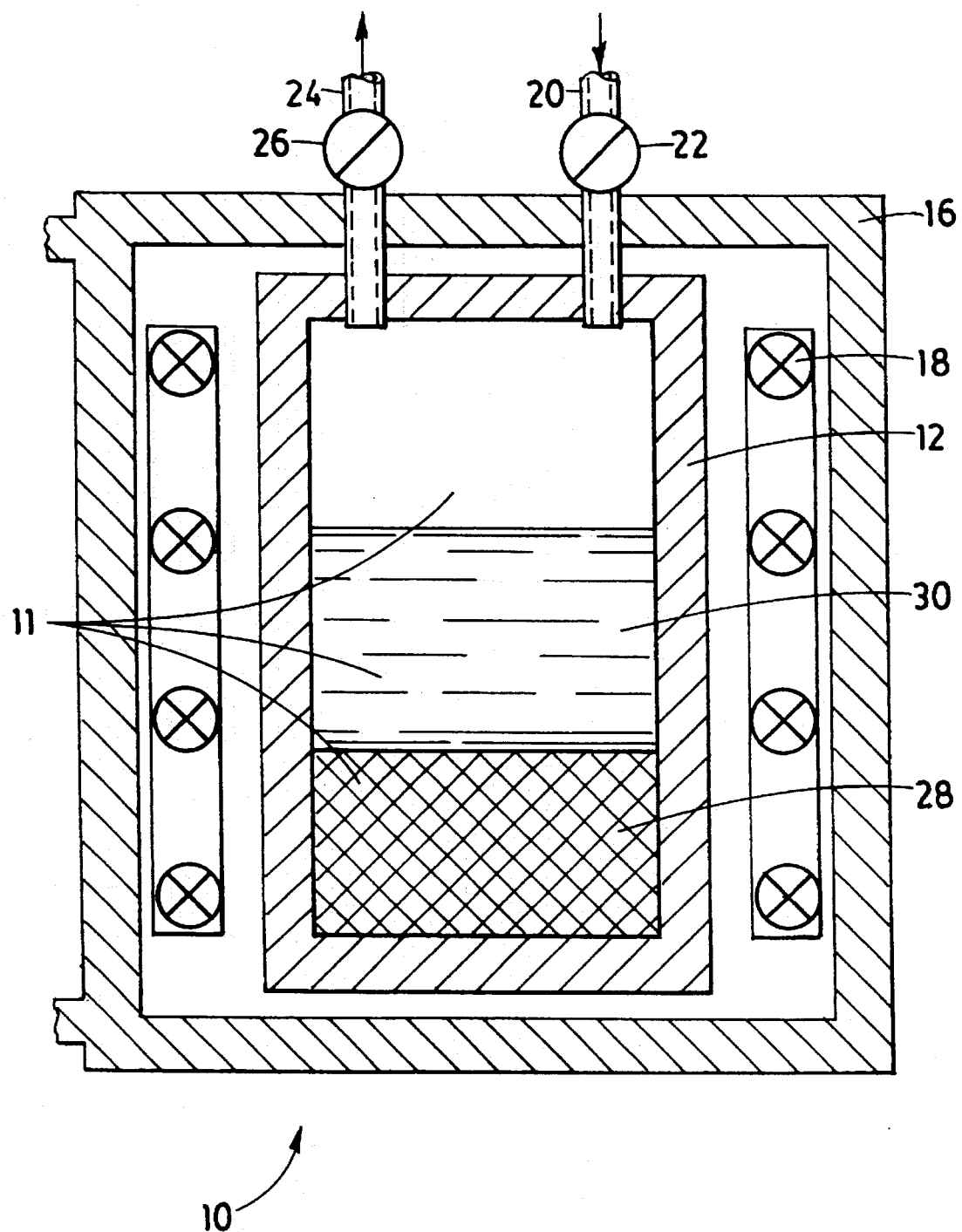
FIG. 1 illustrates a metal infiltration apparatus for use in accordance with the present invention.

The present invention relates to a binder for binding reinforcement materials. The binder is prepared by mixing an aluminum and/or Group IIa-containing compound, or mixtures thereof, with a sufficient amount of phosphorus-containing compound to result in a phosphorus to aluminum and/or Group IIa metal ion ratio of 14 to 34. More preferably, the phosphorus to metal ion ratio is 20 to 30. If necessary, the mixture may be stirred and heated to dissolve the aluminum- or Group IIa-containing compounds.

Suitable aluminum- and Group IIa-containing compounds include hydroxides, phosphates, chlorides, sulphates, nitrates, silicates, propoxides, acetates, carbonates, carbides, fluorides, and the like. Preferred Group IIa-containing compounds are Mg-, Ca-, St-, and Ba-containing compounds.

Suitable phosphorus containing materials include aluminum phosphate, phosphoric acid, metaphosphoric acid, pyrophosphoric acid, orthophosphoric acid, and the like. Phosphoric acid is a preferred phosphate liquid. When phosphorus based acids are utilized, the particular concentration used will depend upon the solubility of the other binder ingredients (such as, for example, aluminum hydroxide, calcium hydroxide, etc.).

In a preferred embodiment, aluminum hydroxide is mixed with an excessive amount of phosphoric acid such that the phosphorus to aluminum ratio of the mixture is from 14 to 34. Preferably, this mixture is stirred while heating, preferably at 100° to 200° C., more preferably about 150° C., until all of the solids are dissolved. The time needed for dissolving to occur depends on the materials being mixed, as well as the temperature being used. For example, in the case of aluminum hydroxide dissolved in phosphoric acid (P/Al ratio of 14 to 34), 120° C. for 50 minutes or 200° C. for 20 minutes is usually sufficient. Upon cooling to room temperature, the mixture remains in solution.

The binder is operable with a wide variety of reinforcement materials, including, but not limited to, silicon carbide, boron carbide, silicon, silicon oxide, silicon nitride, aluminum nitride, aluminum oxide, titanium diboride, carbon, graphite, or mixtures thereof. To produce a preform, the binder is first mixed with a quantity of these reinforcement materials, which may be in the form of fibers, whiskers, flakes, particles, or mixtures thereof. A carrier liquid may be utilized with the binder and reinforcement material in order to help disperse the binder evenly throughout the reinforcement material and arrive at a particular weight percent binder relative to the desired reinforcement material. The carrier should be chosen so that it does not react with the reinforcement material. For example, for preforms formed using silicon carbide whisker reinforcement and an aluminum phosphate binder in accordance with the present invention, water is a suitable carrier. For preforms using aluminum nitride particle reinforcement, non-aqueous carriers such as acetone or alcohol should be used, to avoid reaction between aluminum nitride and water. For example, using AlN particles having a mean size of about 3.7 microns as the reinforcement, acetone carrier in an acetone to binder ratio of about 43 is preferred. This typically results in about 0.1 weight percent binder in the resultant preform after heat treating. For SiC whiskers, on the other hand, water carrier in a carrier to binder ratio of 5 to 25 (more preferably about 15), may be utilized. This typically results in a weight percent binder in the resultant heat treated preform of less than 10 weight percent, preferably about 2 weight percent.

The resultant preform typically consists of at least 90 percent by weight reinforcement material and no more than 10 percent binder material. The porosity of the resultant preform depends to a large extent on the size, shape and particular material utilized for the reinforcement material, as well as the pressures used in preform pressing. Reinforcement materials using particle reinforcement materials typically result in preform porosities of 30 percent or more, while those made using whisker reinforcement materials typically result in preform porosities as high as 70 to 90 percent.

After the reinforcement material has been mixed with the binder and carrier liquid, the resulting slurry, which typically contains 5 to 60 volume percent solids (i.e., reinforcement) is pressed to form a moist preform. Typically, a hydraulic piston-type or similar pressing device is utilized to decrease the amount of liquid in contact with the reinforcement materials. In this way, much of the carrier liquid is removed, leaving a moist preform of reinforcement material and binder. The moist preform then preferably is dried prior to heat treating. If drying of the moist preform occurs too quickly, cracking may occur.

Preferably, prior to liquid infiltration, the preforms are heat treated to above 200° C. Preferably, the preforms are heated to 400°–900° C., more preferably to about 500° C., converting at least some of the phosphate to type A metaphosphate phase. If metal infiltration is carried out without first adequately heat treating the preform, volatile materials cannot efficiently escape the preform. This has a deleterious effect on the tensile strength of the resultant MMC.

FIG. 1 describes an apparatus 10 suitable for liquid infiltration, in particular, pressure assisted liquid infiltration. Apparatus 10 includes chamber 11 which is defined by chamber wall 12. Chamber wall 12 is surrounded by outer furnace wall 16. Furnace wall 16 is in turn surrounded by a water cooling jacket (not shown). The temperature of chamber 11 is controlled by heating elements 18. The pressure inside chamber 11 is increased by admission of pressurized gas through input pipe 20 by manipulation of valve 22. Pressure is released form the chamber 11 through outlet pipe 24 and valve 26.

Although any metal infiltration technique will work in accordance with the present invention, in a preferred infiltration process a metal ingot 30 and preform 28 is placed in chamber 11, which is then sealed and evacuated to a pressure of 50 to 200 mtorr ($9.7 \times 10^{-4}$ to $38.7 \times 10^{-4}$ psi, or 6.7 to 26.7 Pa). Chamber 11 and its contents are then heated to above the liquidus temperature of the metal in the ingot. This temperature is maintained for a period of sufficient time to ensure that the ingot melts. The temperature in chamber 11 may then be lowered to just above the liquidus (this is known as the infiltration temperature, $T_p$), preferably at a cooling rate of about 0.5° to 3.0° C./min. Evacuation is then stopped and valve 22 opened to allow a gas to enter chamber 11 through inlet pipe 20, thereby increasing the pressure in chamber 11, until the infiltration pressure is reached. The infiltration pressure, which typically is about 1000 to 2500 psi (6.9 to 17.3 MPa), forces the melt to penetrate into the preform interstices. Once the infiltration pressure is reached, the electricity supplied to heating element 18 is cut off, and a cooling water jacket (not shown) outside furnace wall 16 is used to cool chamber 11. The pressure is maintained during the solidification and cooling period. Once the temperature is 30° to 50° C. below the solidus for the metal, outlet valve 26 is opened to release the inert gas through outlet pipe 24. Once the chamber temperature is about 300° C. below the solidus, the chamber can be opened, and the composite material demolded from the chamber.

Among metals, aluminum is a particularly preferred matrix material for MMC's because of its low density, low processing temperature, and high ductility. However, other metals, including magnesium, indium, zinc, tin, lead, copper, silver, indium, and alloys thereof, may also be utilized.

After metal infiltration, the MMC may be heat treated at a temperature of about 400°–900° C., if desired. In the case of silicon-containing reinforcement materials, for example, this heat treatment results in the formation of silicon phosphate, $SiP_2O_7$, which serves as an in-situ binder. An in-situ binder, as used herein, is a binder which was not present prior to preheating of the preform, and is formed due to reaction with the reinforcement and/or the metal matrix.

Subsequent heat treatment is also desirable when carbon-containing reinforcement materials are utilized in conjunction with an aluminum matrix. Heat treating these MMC's helps form aluminum phosphide, AlP, which helps protect the carbon fibers from reacting with the aluminum matrix.

The invention may be more easily comprehended by reference to specific examples. It must be understood, however, that these examples are provided only for purposes of illustration, and that the invention may be practiced otherwise than as specifically illustrated without departing from its spirit and scope.

EXAMPLES

Example 1

Four phosphate solutions were prepared by mixing one part of aluminum hydroxide (Al (OH)$_3$), obtained from J. T. Baker Chemical Co.) with phosphoric acid (H$_3$ (PO)$_4$), 85 percent Technical Grade, obtained from Riverside Chemical Co.), so that solutions having calculated atomic P/Al ratios of 3, 6, 12, and 23 were prepared. For convenience, these binders will be referred to as No. P3, P6, P12, and P23, respectively.

The resultant slurries were stirred and simultaneously heated to approximately 150° C., then held at this temperature until all of the solids dissolved. Working solutions of all of these binders were prepared at a concentration of one part binder to 15 parts water, unless stated otherwise. These concentrations resulted in preforms which contained about 3 to 5 weight percent phosphate.

A comparative binder was prepared using a mixture of 30 weight percent silica in water, obtained from Fisher Scientific Co.. This mixture was used at a concentration of one part binder to six parts of water.

The binders were first characterized without any reinforcement. The binders were dried by heating at 200° C. for one week. The binders were then heat treated at 500°, 800°, 1100° and 1200° C. in air (except the 1200° C. treatment of phosphate binders, which used argon). Heat treatment was controlled by increasing the temperature from room temperature to the target temperature at the rate of 10° C./min, holding at the target temperature (500°, 800°, 1100° or 1200° C.) for 4 h, and then cooling to room temperature at an initial rate of 10° C./min and finally (below around 650° C.) at the rate corresponding to furnace cooling (i.e., cooling rate ≤ 10° C./min).

Atomic absorption analysis of the diluted phosphate binders P3, P6, P12 and P23 revealed that resulting P/Al atom ratios of the liquid binders were comparable to the expected ratios of 3, 6, 12 and 23, namely, 2.2, 5.8, 9.3, and 24, respectively. Energy dispersive X-ray spectrometry (EDS) (Hitachi SEM S800) was used to analyze the P/Al ratio in the phosphates P3, P6, P12 and P23 after heating at either 500° or 800° C. As illustrated in Table 1, the values after heat treatment decreased for the P6, P12, and P23 phosphate binders, but increased for the P3 phosphate binder after heating at 500° or 800° C. The amount of phosphorus containing compounds (believed to be primarily H$_3$PO$_4$) released between heating at 500° C. and 800° C. is also shown. Thermogravimetric analysis (TGA) revealed that most of this weight loss occurred between 600° and 700° C.

TABLE 1

P/Al Atom Ratio of the Phosphates After Heat Treatments

| Binder | 500° C. | 800° C. | Released H$_3$PO$_4$* (Wt. %) |
|---|---|---|---|
| P3 | 3.50 | 3.32 | 5 |
| P6 | 3.81 | 3.40 | 12 |
| P12 | 4.22 | 3.63 | 15 |
| P23 | 4.80 | 3.95 | 19 |

*H$_3$PO$_4$ and/or other forms of phosphorus.

The increase in heating temperature from 500° to 800° C. caused the P/Al ratio to decrease due to the release of phosphoric acid. Generally, the fractional weight loss due to phosphoric acid (or other forms of phosphorus) release increased with increasing P/Al ratio in the original binder.

Example 2

The silica and phosphate binders described in Example 1 were used to form SiC whisker preforms. The α-SiC whiskers (Form IV) were SILAR SC-9, supplied by Advanced Composites Materials Corporation, having an average diameter of 0.6 μm and a length of 10–80 μm.

Preforms were fabricated using a cylindrical piston-type hydraulic press having an inside diameter of about 40 mm. SiC whiskers were mixed with working solutions of binder (1 part binder to 15 parts water) to form slurries having about 40 to 50 volume percent whiskers. These slurries were poured into a hydraulic press, and pressed to a pressure of 4.0 MPa. Excess liquid in the preform escaped around the piston. The preforms were then removed from the press and dried in air at 200° C. for 24 hours. Table 2 shows the weight fraction of binder in the resulting preforms, all of which contained about 22 volume percent whiskers after drying at 200° C.

TABLE 2

Binder Content in SiC Whisker Preforms After Drying at 200° C.

| Binder (carrier) | Weight Fraction (Wt. %) |
|---|---|
| Silica (water) | 2.7 (0.4)* |
| P3 (water) | 4.4 (0.4) |
| P6 (water) | 4.0 (0.6) |
| P23 (water) | 4.1 (0.9) |
| P23 (acetone) | 5.3 (0.5) |

*Value in () shows the standard deviation.

The large weight fraction difference between the silica and phosphate binders is believed to be due to the stronger chemical reactivity of the phosphates with SiC, as well as the higher viscosity of the phosphate binders. The SiC whisker preform made using one part phosphate P23 solution with 15 parts acetone had the highest weight fraction (5.3 percent), probably due to the higher volatility of acetone. After drying, the preforms were heat treated at 500°, 800°, 1100° and 1200° C., except for the P23 preform using acetone carrier, which was only heat treated at 500° C. The temperature was increased from room temperature at the rate of 10° C./min, kept at the target temperature (500°, 800°, 1100° or 1200° C.) for 4 hours, and then cooled to room temperature at an initial rate of 10° C./min and finally (below about 650° C.) at the rate corresponding to furnace cooling (i.e., cooling rate ≤ 10° C./min). Unless otherwise indicated, all heat treatments were conducted in air atmosphere.

All the SiC whisker preform samples prepared were strong enough to meet the requirement for net shaping casting. The height difference of the preform measured before and after liquid metal infiltration was within 0.5 mm, which is less than the degree of accuracy of measurement, and less than 2.5 percent of the height (~20 mm) of the preform.

Compressive strength is a property which is closely related to the binding ability of the binder in the preform. The compressive strength of SiC whisker preforms made with both silica and phosphate P23 binders are compared in Table 3 below.

TABLE 3

Compressive strength of SiC whisker preforms made by using the silica and phosphate P23 binders

| Binder | Heat Treating Temperature (°C.) | Compression Strength (MPa) |
| --- | --- | --- |
| Silica | 200 | 3.25 (0.37)* |
|  | 500 | 3.66 (0.20) |
|  | 800 | 4.29 (0.25) |
|  | (air) 1100 | 10.52 (0.45) |
|  | (argon) 1100 | 5.76 (0.25) |
| Phosphate (P23) | 200 | 1.64 (0.13) |
|  | 500 | 5.93 (0.20) |
|  | 800 | 11.04 (0.20) |
|  | (air) 1100 | 15.90 (0.15) |
|  | (argon) 1100 | 7.44 (0.24) |

As illustrated in Table 3, when preheated to temperatures greater then 200° C., preforms made with P23 phosphate binders had higher compressive strengths than those made using silica binders. The compressive failure of the SiC whisker preforms made with the phosphate binders was in shear, whereas the failure of the SiC whisker preforms made by using the silica binder involved lateral surface buckling.

The strongest SiC reinforced preform illustrated in Table 3 was obtained using the phosphate P23 binder and heat treating at 1100° C. in air. However, at pretreating temperatures of 500° and 800° C., compression strength increased with decreasing P/Al ratios. Table 4 illustrates the compressive strengths of preforms made with four different phosphate binders, namely P3, P6, P12 and P23 binders, after heating at 500°, 800° and 1200° C. (in argon).

TABLE 4

Compressive strength (MPa) of SiC whisker preforms made by using the phosphate binders

| Preform | 500° C. | 800° C. | 1200° C. |
| --- | --- | --- | --- |
| SiC (P3) | 9.08 (0.23)* | 11.98 (0.49) | 10.52 (0.31) |
| SiC (P6) | 6.25 (0.23) | 11.67 (0.17) | — |
| SiC (P12) | 6.11 (0.18) | 11.53 (0.29) | — |
| SiC (P23) | 5.93 (0.20) | 11.04 (0.20) | 7.99 (0.42) |

*value in () shows standard deviation

Example 3

Carbon fiber preforms were prepared using the same technique used to prepare SiC reinforced preforms. The chopped carbon fibers were Ashland Petroleum's Carboflex P-100. They were pitch-based, unsized, and had a length of about 100 μm and a diameter of about 10 μm. Silica and phosphate P23 binders were used. After making a slurry by mixing chopped carbon fibers with working solutions of each binder (see Table 5 for binder/carrier ratios), wet forming of preforms was performed as explained above at a pressure of 1 MPa. The carbon fiber preforms after subsequent drying contained an average of 55 volume percent (50–60 volume percent) carbon fibers. The much higher volume fraction of reinforcement in the carbon fiber preforms (50–60 percent) compared to SiC whisker preforms (22 percent) is due to the smaller aspect ratio of the carbon fiber (~10) compared to that (20–150) of SiC whiskers. The volume fraction of 55 percent approaches the value generally obtained for powder preforms, in which the powder particles typically have an aspect ratio of 1 to 5.

Four carbon fiber preforms were prepared with silica or phosphate P23 binder. Two of the four used the same binder/water ratio as in previous cases (silica: 1/6; phosphate P23: 1/15). The third and fourth types of preforms used the phosphate P23 binder with a binder/acetone (no water) ratio of 1/15 and 1/5, respectively. Table 5 shows the binder content of the carbon fiber preforms used for fabricating MMC's.

TABLE 5

Binder Content in C-fiber Preforms After Drying at 200° C.

| Binder (carrier) | Weight Fraction (Wt. %) |
| --- | --- |
| Silica | 1.1 (0.2)* |
| P23 (1:15 water) | 1.9 (0.3) |
| P23 (1:15 acetone) | 2.0 (0.2) |
| P23 (1:5 acetone) | 5.3 (0.2) |

*Value in () shows the standard deviation.

The carbon fiber preforms were dried in air at 200° C. for 24 hours. The preforms were then heat treated at 800° C. or a higher temperature of 1100° C. Any heating above 200° C. was performed in an argon atmosphere to prevent oxidation of the carbon fibers. The temperature was increased from room temperature at the rate of 10° C./min, kept at the target temperature (800° or 1100° C.) for 4 h, and then cooled to room temperature at a rate of about 10° C./min.

Example 4

Aluminum-matrix composites containing either SiC whisker or short carbon fiber heat treated preforms the fabrication of which are described above in examples 2 and 3) were fabricated by liquid metal infiltration. Aluminum was used as the matrix material. The aluminum used was alloy 170.1 (obtained from Roth Bros. Smelting Corp.), and consisted of Al (99.77 percent), Fe (0.17 percent) and Si (0.04 percent). Using metal infiltration apparatus 10 illustrated in FIG. 1, chamber 11 was evacuated using a mechanical vacuum pump (not shown). Argon gas was forced into chamber 11 via input tube 20. The pressure of the inert gas in the bottle was regulated using valve 22. The inner wall surface of the chamber wall 12 was coated with a graphite paste for ease in demolding. Before the high pressure gas was introduced into chamber 11 via tube 20, the temperature of aluminum melt 30 was heated to about 100° C. above the liquidus, then allowed to drop to close to the infiltration temperature ($T_p$), which in this case was 665° C. The infiltration pressure used was 2000 psi (13.8 MPa). A time of 40 to 80 s was needed to reach the pressure of 2000 psi (13.8 MPa).

Table 6 below compares the tensile strength, yield strength, Young's modulus and ductility of MMC's made from preforms prepared using silica with those made using preforms made with P23 phosphorus containing binder.

TABLE 6

Mechanical properties of SiC whisker reinforced metal-matrix composites and their variation with the preform heat treatment temperatures

| Binder | Preform heat treatment | SiC$_w$ vol. fraction (%) | Tensile strength (MPa) | Yield strength (MPa) | Young's modulus (GPa) | Ductility (%) |
|---|---|---|---|---|---|---|
| Silica | 200° C. | 22.2 | 306.0 (9.5)* | 139.5 (5.7) | 105.2 (8.8) | 2.1 (0.7) |
| Silica | 500° C. | 22.5 | 331.9 (9.3) | 168.2 (6.3) | 110.1 (5.2) | 2.6 (0.4) |
| Silica | 800° C. | 21.8 | 311.8 (33.0) | 171.6 (7.1) | 105.3 (2.3) | 2.1 (0.7) |
| Silica | 1100° C. (air) | 22.6 | 252.8 (49.5) | 161.2 (5.4) | 93.9 (17.8) | 0.7 (0.2) |
| Silica | 1100° C. (argon) | 21.8 | 288.4 (12.2) | 148.2 (6.5) | 87.6 (3.8) | 2.5 (0.5) |
| Phosphate P23 | 200° C. | 22.4 | 323.7 (13.3) | 142.8 (9.3) | 116.0 (7.8) | 2.7 (1.1) |
| Phosphate P23 | 500° C. | 22.5 | 368.4 (14.4) | 155.3 (7.4) | 116.7 (4.5) | 2.9 (0.3) |
| Phosphate P23 | 800° C. | 22.5 | 343.0 (6.3) | 157.8 (9.9) | 97.5 (7.2) | 2.3 (0.5) |
| Phosphate P23 | 1100° C. (air) | 22.8 | 313.1 (23.3) | 231.9 (12.7) | 96.4 (2.7) | 1.4 (0.4) |
| Phosphate P23 | 1100° C. (argon) | 22.3 | 318.9 (20.9) | 163.4 (6.8) | 96.2 (8.4) | 2.4 (0.7) |

*Value in () shows the standard deviation.

Table 7 illustrates the properties of SiC metal-matrix composites made using preforms with phosphorus containing binders having varying phosphorus/aluminum ratios.

TABLE 7

Mechanical properties of SiC whisker reinforced metal-matrix composites with the variation of the preform binder species

| Binder | Preform heat treatment | Composite heat treatment | Tensile strength (MPa) | Yield strength (MPa) | Young's modulus (GPa) | Ductility (%) |
|---|---|---|---|---|---|---|
| Silica | 500° C. | without heating | 331.9 (9.3)* | 168.2 (6.3) | 110.1 (5.2) | 2.6 (0.4) |
| Phosphate P3 | 500° C. | without heating | 336.5 (13.2) | 135.6 (5.8) | 106.9 (5.5) | 3.6 (0.7) |
| Phosphate P3 | 1200° C. (argon) | without heating | 335.9 (5.6) | 142.4 (1.1) | 95.2 (4.2) | 3.9 (0.5) |
| Phosphate P6 | 500° C. | without heating | 345.6 (8.7) | 152.7 (5.6) | 119.4 (6.8) | 3.1 (0.7) |
| Phosphate P23 (water) | 500° C. | without heating | 368.4 (14.4) | 155.3 (7.4) | 116.7 (4.5) | 2.9 (0.3) |
| Phosphate P23 (acetone) | 500° C. | without heating | 358.0 (11.0) | 149.3 (8.0) | 114.4 (6.3) | 2.9 (0.7) |

*Value in () shows the standard deviation.

For both the silica and phosphate P23 binders, the tensile strength was highest for the MMC which was heat treated at 500° C., and lowest for the preform which was heat treated at 1100° C. in air. Tensile strength was lowest for the MMC made using the silica binder, and highest for the MMC using phosphate P23 binder and water carrier. For phosphorus containing MMC's, tensile strength increased with increasing phosphorus content. The coefficient of thermal expansion (CTE) was lower for composites made using the phosphate P23 binder than composites made using the silica binder (all samples were annealed at 600° C. for 2 hours prior to CTE measurement). The difference in CTE between these MMC's increased with increasing test temperature.

When the SiC composites were subsequently heat treated at 600° C. for 240 hours, the tensile strength of those using silica binder decreased. Conversely, MMC's using phosphate P3 binder (after preform heat treatment at 500° or 1200° C. (in argon)) maintained their tensile strength, and the tensile strength of MMC's using phosphate P6 or P23 binder increased (in addition to the already increased amount before the heat treatment at 600° C. for 240 hours).

Aluminum metaphosphate (Al(PO$_3$)$_3$) was found to be a good binder for MMC's, at least up to 1000° C. Above 1000° C., it may dissociate to form metaphosphate glass and/or aluminum orthophosphate (AlPO$_4$), which are less preferable phases for binding than type A metaphosphate. Aluminum metaphosphate Al(PO$_3$)$_3$, metaphosphate glass and aluminum orthophosphate AlPO$_4$ all help to protect SiC whiskers from attack by aluminum metal matrices. This results in the maintenance of the tensile strength of the composites, even after heat exposure at 600° C. for 10 days.

The amount of silicon phosphate, SiP$_2$O$_7$, in both uninfiltrated preforms and MMC's, increased as the phosphorus content in the liquid binder increased. The amount of AlP in MMC's increased as the amount of phosphorus in the liquid binder increased.

The mechanical properties of carbon fiber composites, illustrated in Table 8, below, show that the use of phosphate P23 binder results in higher tensile strength, even without subsequent heat treatment of the composite. It is believed that this is in large part due to the formation of aluminum phosphide (AlP) formed by a reaction between phosphorus in the binder and the aluminum metal matrix. In contrast, carbon fiber composites using preforms made with silica binder showed no AlP reaction product.

510° C. at a controlled rate of 1.4° C./minute, (iii) holding at 510° C. for 3 hours, and (iv) cooling in the closed furnace. No oxidation of AlN was detected by X-ray diffraction of the AlN preforms after baking in air at 660° C. for 43 hours. In comparison, a mixture of AlN with 1 weight percent $Al_2O_3$ showed clear $Al_2O_3$ X-ray diffraction peaks.

TABLE 8

Mechanical Properties of Carbon Fiber Composites With the Variation of Preform Binder Species

| Binder | Preform heat treatment | Composite heat treatment | Tensile strength (MPa) | Yield strength (MPa) | Young's modulus (GPa) | Ductility (%) |
|---|---|---|---|---|---|---|
| Silica | 200° C. | without heating | 91.6 (9.7)* | 67.8 (0.5) | 54.3 (4.0) | 1.3 (0.3) |
| Phosphate P23 (1:15 water) | 200° C. | without heating | 105.4 (5.2) | 66.2 (5.4) | 52.9 (2.8) | 1.8 (0.4) |
| Phosphate P23 (1:15 acetone) | 200° C. | without heating | 101.3 (5.7) | 68.4 (3.2) | 52.1 (2.4) | 1.1 (0.3) |
| Phosphate P23 (1:15 acetone | 200° C. | without heating | 108.6 (10.3) | 80.8 (2.3) | 53.6 (1.7) | 1.6 (0.4) |

*Value in () shows the standard deviation.

Example 5

Aluminum metal-matrix composites were prepared using preforms made with either AlN particles, SiC particles or $Al_2O_3$ particles. The binder used was phosphate binder P23 (described in Example 1).

The AlN and SiC particles used were provided by Advanced Refractory Technologies, Inc. and Electro Abrasives, Inc., respectively. The calcined alumina particles (A-17) were obtained from Aluminum Company of America (ALCOA). The AlN particle size ranged from 2 to 7 μm, with a mean at 3.7 μm, but coarse particles of up to 12 μm were also present in the powders. The SiC particle size ranged from 1 to 10 μm, with a mean at 3 μm. The alumina particle size had an average of 3.0 to 3.5 μm. The composition of AlN was 66.0 percent Al, 33.0 percent N, 0.07 percent C, 1.0 percent O, 0.005 percent Fe and 0.005 percent Si. The composition of SiC was 98.5 percent SiC, 0.5 percent $SiO_2$, 0.3 percent Si, 0.08 percent Fe, 0.1 percent Al, 0.3 percent C. The calcined alumina contained 99.7 percent $Al_2O_3$, 0.08 percent $Na_2O$, 0.02 percent $SiO_2$, 0.01 percent $Fe_2O_3$ and 0.001 percent $B_2O_3$. The metal used was aluminum (170.1), the tensile strength of which was 65 MPa.

Metal-matrix composites were fabricated by liquid metal infiltration using apparatus 10 illustrated in FIG. 1. The AlN, SiC or $Al_2O_3$ reinforced preforms were prepared by compressing in a die a slurry containing AlN, SiC or $Al_2O_3$ powder, a liquid carrier (acetone) and the phosphate P23 binder (A silica colloid was also tried as the binder, resulting in preforms that were much weaker than those obtained using a phosphate binder). Acetone was used as carrier liquid rather than water to prevent reaction of AlN with $H_2O$ to form $Al(OH)_3$ and $NH_3$. The carrier/binder ratio was from 40:1 to 45:1 by volume. The resulting dry preforms contained ~0.1 weight percent binder. Excessive amounts of binder resulted in too little porosity in the preform for subsequent liquid metal infiltration even at 6000 psi (41 MPa). The die allowed excessive liquid to be squeezed out. After removal from the die, the compacts were dried at room temperature for 3 hours. After drying, which removed most of the acetone, the preforms were fired by (i) placing the preform in a furnace at room temperature, (ii) heating to The porosity of the aluminum nitride MMC's decreased with increasing infiltration pressure (12.4 percent at 3500 psi, 5.4 percent at 4500 psi, and 1.1–1.4 percent at 6000 psi) for a composite containing 58.6 volume percent AlN.

The Al/SiC particle composite fabricated at 6000 psi (41 MPa) exhibited less porosity than the Al/AlN composite fabricated at the same pressure, probably because of the higher wetability between Al and SiC due to interfacial reaction of SiC with Al. Conversely, Al/$Al_2O_3$ fabricated under the same condition had a higher porosity than Al/AlN.

Aluminum metal MMC's prepared using AlN particles had higher strength and ductility and better high-temperature resistance than those prepared using SiC or $Al_2O_3$ particles. The superior effect of AlN compared to SiC is believed to be due to the fact that AlN does not react with Al whereas SiC does. The reaction of SiC with Al degrades the bonding between SiC and Al, so that both the strength and ductility decrease significantly after heating at 600° C.

Table 9 below illustrates the room temperature properties of aluminum metal MMC's made using various particle reinforcement materials.

TABLE 9

The Room Temperature Tensile Properties* of Al/AlN, Al/SiC and Al/$Al_2O_3$ Composites

| Vol. Fraction | Strength (MPA) | Modulus (GPa) Measured | Theoretical‡ | Ductility (%) |
|---|---|---|---|---|
| 100.0% Al | 72.7 (1.1) | 61.7 (3.4) | | 22.8 (1.9) |
| 55.0% SiC | 313.0 (37.5) | 183.4 (15.0) | 158.5 | 0.7 (0.3) |
| 58.6% AlN | 300.9 (25.2) | 144.3 (4.2) | 146.7 | 1.1 (0.4) |
| 63.3% AlN | 406.3 (33.9) | 163.5 (36.5) | 159.4 | 1.0 (0.2) |
| 61.2% $Al_2O_3$ | 275.8 (14.6) | 161.6 (6.9) | 158.9 | 0.5 (0.1) |
| 70.2% $Al_2O_3$ | 237.8 (8.4) | 181.4 (10.8) | 187.8 | 0.4 (0.1) |

*Standard deviation shown in parentheses
‡Hashin & Shtrikrman [20]
$E_{AlN}$ = 345 GPa, $E_{SiC}$ = 440 GPa, $E_{Al2O3}$ = GPa The use of the phosphate binders instead of the widely used silica binder results in improved temperature resistance, increased tensile strength and decreased coefficient of thermal expansion. These effects were largest for liquid phosphate binders containing the largest amount of phosphoric acid in the liquid binder. It is believed that these effects are at least partly due to phosphate binder phases, such as aluminum metaphosphate, metaphosphate glass, or aluminum orthophosphate. In SiC reinforced MMC's, the phosphate binder reacts to form a silicon phosphate ($SiP_2O_7$) reaction product. This serves as an in-situ binder which enhances the binding action of the original (ex-situ) binder. As a result, the compressive strength of the preform and the temperature resistance of the composite is increased. Comparison of Table 4 with Table 7 illustrates that the Al/P ratio used to obtain the strongest preforms did not necessarily result in the strongest MMC's.

The invention has been described in accordance with the preferred embodiments. It should be understood, however, that the invention could be practiced otherwise without departing from the spirit and scope of the invention. For example, while the examples above have utilized SiC whiskers, carbon fibers, SiC particles, AlN particles and $Al_2O_3$ particles as reinforcements, other reinforcements, such as graphite flakes, $TiB_2$ particles, silicon particles, and others can be substituted therefor.

What is claimed:

1. A preform for preparing metal matrix composite comprising:

a reinforcement material; and a binder applied to said reinforcement material, said binding comprising a type A aluminum metaphosphate, a Group IIa metal metaphosphate, or combination of a type A aluminum metaphosphate and a Group IIa metal metaphosphate, wherein said binder has an excess of phosphorus in an atomic ratio of phosphorus to aluminum of 3.4 to 7 or in an atomic ratio of phosphorus to Group IIa metal of 3.4 to 7.

2. A preform according to claim 1, wherein said atomic ratio is from 3.4 to 5.

3. A preform according to claim 1, wherein said binder consists essentially of a type A aluminum metaphosphate, a Group IIa metaphosphate, or a combination of a type A aluminum metaphosphate and a Group IIa metaphosphate.

4. A preform according to claim 1, wherein said reinforcement material is selected from the group consisting of silicon carbide, boron carbide, aluminum nitride, titanium diboride, silicon, silicon nitride, silicon oxide, aluminum oxide, carbon, graphite, and mixtures thereof.

5. A preform according to claim 1, wherein said reinforcement material is selected from the group consisting of whiskers, fibers, particles, flakes, and mixtures thereof.

6. A preform according to claim 1, wherein said preform comprises 0.05 to 10 weight percent binder.

7. A preform for preparing metal-matrix composites comprising:

a reinforcement material; and a binder comprising a type A aluminum metaphosphate, a Group IIa metal metaphosphate, or a combination of a type A aluminum metaphosphate and a Group IIa metal metaphosphate, wherein the binder is prepared by combining, in a liquid, an aluminum-containing compound, a Group IIa metal-containing compound, or a combination of an aluminum-containing compound and a Group IIa metal-containing compound, with a phosphorus-containing compound, at an atomic ratio of phosphorus to aluminum of 14 to 34 and an atomic ratio of phosphorus to Group IIa ions of 14 to 34, and heating said binder to volatilize the liquid.

8. A preform according to claim 7, wherein the binder is prepared by combining, in a liquid, an aluminum-containing compound with a phosphorus-containing compound, wherein, said heating is at 800° C. and the binder after said heating has a phosphorus to aluminum ratio of at least 3.4.

9. A preform according to claim 7, wherein said reinforcement material is selected from the group consisting of silicon carbide, boron carbide, aluminum nitride, titanium diboride, silicon, silicon nitride, silicon oxide, aluminum oxide, carbon, graphite, and mixtures thereof.

10. A preform according to claim 7, wherein said reinforcement material is selected from the group consisting of whiskers, fibers, particles, flakes, and mixtures thereof.

* * * * *